Feb. 27, 1951     C. S. BOUCHARD     2,543,148
SHAFT OR PIN LOCKING MECHANISM
Filed April 29, 1948
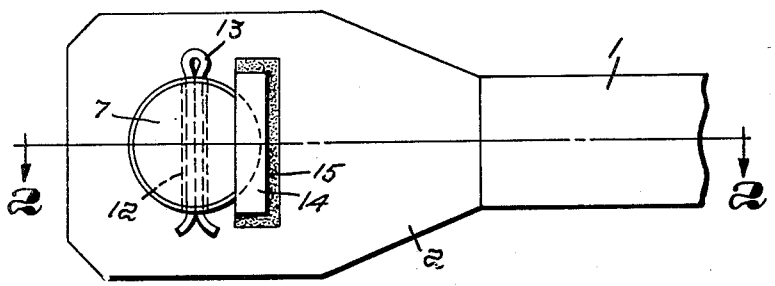
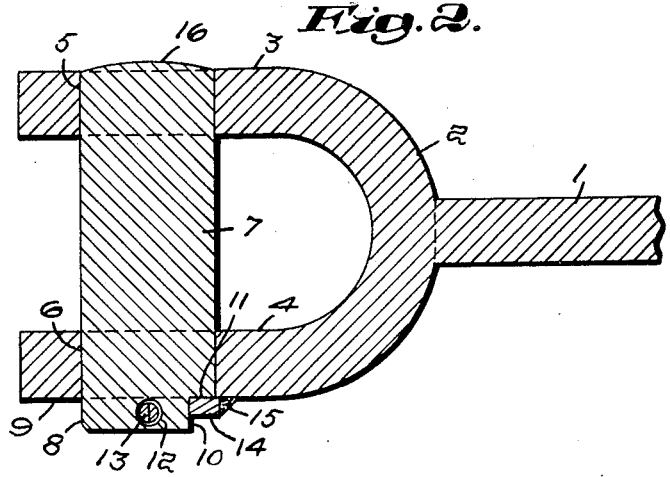
Inventor:
Charles S. Bouchard,
by Heard Smith & Tennant
Attorneys Patented Feb. 27, 1951

2,543,148

UNITED STATES PATENT OFFICE 2,543,148

SHAFT OR PIN LOCKING MECHANISM

Charles S. Bouchard, Wellesley, Mass., assignor to Lewis-Shepard Company, Watertown, Mass., a corporation of Massachusetts Application April 29, 1948, Serial No. 24,081

5 Claims. (Cl. 287—100)

This invention relates to improvements in locking mechanism for rigidly but detachably securing a shaft or pin in a mounting therefor having an aperture or alined apertures through which the pin may be inserted endwise.

The general object of the invention is to provide cooperating means upon the mounting and one end portion of the shaft or pin which will normally lock the shaft fixedly in the mounting against longitudinal or rotative movement, but which will enable ready removal of the shaft or pin therefrom.

Another object of the invention is to provide a shaft or pin locking mechanism which can be economically constructed and assembled and which will be more rigid and effective in operation than other locking mechanisms heretofore produced for like purposes.

More specifically the object of the invention is to provide mechanism for locking a cylindrical shaft or pin in a mounting having parallel arms or walls with axially alined apertures therein in such a manner as to prevent the shaft from longitudinal or rotative movement therein so that the shaft or pin may form between said arms a journal for a pulley or wheel or a transverse member of the yoke-shaped end of a connecting rod, an element of a universal joint, a shackle, clevis, etc.

These and other objects and features of the invention will more fully appear from the following description and the accompanying drawing and will be particularly pointed out in the claims.

An illustrative embodiment of the invention is shown in the accompanying drawing, in which, Fig. 1 is a side view of a portion of a machine element having a pin secured therein and locking mechanism embodying the invention; and, Fig. 2 is a vertical sectional view on line 2—2 Fig. 1.

The invention as illustrated in the drawing comprises a machine element such as a bar 1 having a bifurcated end in the form of a yoke 2 having spaced parallel arms 3 and 4 provided with axially alined, preferably cylindrical, apertures 5 and 6 through which a shaft or pin 7 fitting the apertures is inserted through the aperture 5 with the end portion 8 of the shaft or pin projecting a short distance beyond the outer face 9 of the arm 4. The projecting end portion 8 of the pin is provided with a recess or notch 10, which when produced in a cylindrical shaft or pin is in the form of a segment, having a wall 11 preferably flush with the outer face 9 of the arm 4. The projecting end 8 of the pin is also provided with a bore or hole 12 contiguous to the plane of the outer face 9 of the yoke arm 4 with means adapted when secured in the hole to engage said outer surface 9.

Any suitable means may be provided for accomplishing the purpose such, for example, as a cotter pin 13 adapted to be inserted through the hole and spread at its ends normally to secure the shaft from longitudinal movement in one direction. Means cooperating with the cotter pin for preventing longitudinal movement in the other direction and for securing the shaft from rotative movement comprises a bar 14 adapted to fit within the notch 10 and secured to the arm 4 of the bar preferably by welding 15. By reason of the cooperation of the bar and cotter pin the shaft 7 is rigidly secured within the yoke of the machine element.

In the construction illustrated the opposite end 16 is substantially flush with the outer surface of the arm 3 or may be slightly crowned as shown in Fig. 2.

It will however be obvious that the shaft or pin may extend beyond the mounting to provide a stud or stud shaft adapted to form a journal for a rotatable member or for such other purpose as may be desired and that the mounting in which the shaft is secured at one end as above described may be of solid construction of sufficient thickness properly to support the shaft or may be parallel walls, brackets, or other mounting having alined apertures therethrough in which the shaft is secured at one end by the locking mechanism herein described.

It will therefore be understood that the particular embodiment of the invention shown and described herein is of an illustrative character and not restrictive of the meaning and scope of the following claims.

Having thus described the invention, what is claimed as new, and desired to be secured by Letters Patent, is:

1. Locking mechanism for fixedly but detachably securing a headless cylindrical shaft or pin in a mounting having an aperture through which the shaft or pin is insertable longitudinally, said shaft or pin having a recess in its cylindrical face with a wall flush with a face of said mounting, an abutment member fixedly secured to said wall face and extending into the recess in said shaft or pin, and means detachably connected to the shaft or pin engaging said face of the mounting.

2. Locking mechanism for fixedly but detachably securing a headless cylindrical shaft or pin in a mounting having an aperture through which the shaft or pin is insertable longitudinally, said shaft or pin having a segmental recess in its cylindrical face with a wall flush with a face of said mounting and a hole through the shaft or pin contiguous to said face, an abutment member fixedly secured to said wall face and extending into the recess in said shaft or pin, and means detachably secured in said hole engaging said wall face acting in cooperation with said abutment member normally to prevent longitudinal or rotative movement of the shaft or pin relatively to said mounting.

3. Locking mechanism for rigidly but detachably securing a headless cylindrical shaft in rigid parallel metal members of a mounting having like axially alined cylindrical shaft-receiving apertures, said shaft being insertable lengthwise through said alined apertures with the end thereof projecting a short distance beyond the outer face of one of said parallel members and provided with a segmental notch in its cylindrical face having a wall flush with said outer face and a hole extending through the cylindrical projecting end of the shaft contiguous to said outer face, a metal bar welded to said outer face extending into and fitting said notch, and a cotter pin mounted in and extending through said hole in contact with said outer face.

4. Locking mechanism for rigidly but detachably securing a headless cylindrical shaft in and transversely through alined holes in the arms of a yoke of a metallic member with the cylindrical end of the shaft projecting slightly beyond the outer face of one of said arms and having a segmental notch in said cylindrical end with a wall flush with the outer face of said arm and a hole extending through the projecting cylindrical end of the shaft in parallelism with said notch and contiguous to said outer face, a bar welded to said face of the yoke arm fitting said notch, and a cotter pin removably mounted in said hole engaging the face of the yoke arm.

5. Locking mechanism for rigidly but detachably mounting a headless cylindrical shaft in and transversely through alined holes in the arms of a yoke of a metallic member, said shaft having one end substantially flush with the outer face of one of said yoke arms and its other end projecting slightly beyond the outer face of the other yoke arms and provided with a segmental notch in its cylindrical face having a wall flush with the outer face of said other arm and a hole extending through the projecting end of said shaft, a bar welded to the face of said other yoke arm fitting said notch, and a cotter pin removably mounted in said hole engaging the outer face of said other yoke arm, said bar and cotter pin acting in conjunction normally to prevent longitudinal or rotative movement of the shaft relatively to said yoke but adapted upon removal of said cotter pin to enable the shaft to be removed from the yoke.

CHARLES S. BOUCHARD.

REFERENCES CITED

The following references are of record in the file of this patent:

UNITED STATES PATENTS

| Number | Name | Date |
|---|---|---|
| 1,759,089 | Black | May 20, 1930 |

FOREIGN PATENTS

| Number | Country | Date |
|---|---|---|
| 339,246 | Great Britain | of 1930 |